Aug. 2, 1949.  A. M. KISS  2,477,752
METHOD OF TREATING EGGS TO PRODUCE
CHICKS HAVING COLORED DOWN
Filed April 8, 1947
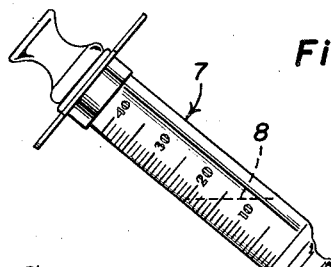
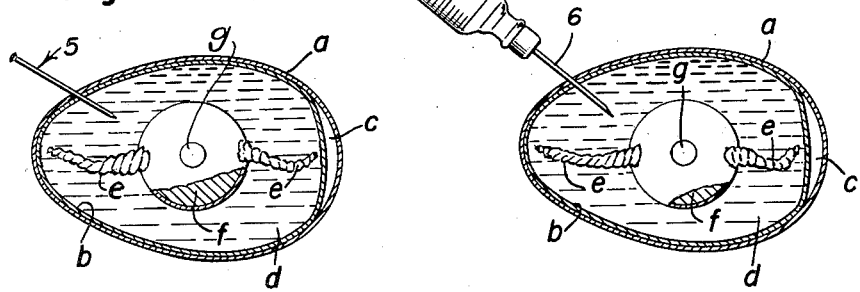
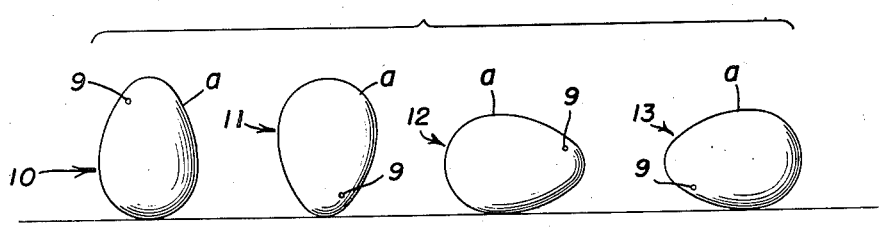
Inventor
Aya Mary Kiss
By *Clarence A. O'Brien
and Harvey B. Jacobson*
Attorneys Patented Aug. 2, 1949

2,477,752

UNITED STATES PATENT OFFICE 2,477,752

METHOD OF TREATING EGGS TO PRODUCE CHICKS HAVING COLORED DOWN

Aya Mary Kiss, Cleveland, Ohio, assignor of forty per cent to William A. Weiss, Cleveland, Ohio Application April 8, 1947, Serial No. 740,145

5 Claims. (Cl. 119—1)

This invention relates to a method of treating fertile eggs for the purpose of producing chicks having down of predetermined colors.

The primary purpose of the present invention is to produce chicks with colored down for use as novelties at Easter time. The process aims to merely produce chicks whose down is of predetermined colors.

An important object of the present invention is to provide a method of the above kind by means of which the treatment may be safely and expeditiously carried out, and whereby uniformly satisfactory results may be attained.

The exact nature of the present method, as well as more specific objects and features thereof, will become apparent from the following description when considered in connection with the accompanying drawing, in which:

Figure 1 is a central longitudinal section of a hen's egg having its shell and layers of membrana putaminis pierced in accordance with the first step of the present method, the yoke being shown only partly in section;

Figure 2 is a view similar to Figure 1 illustrating the second step of the method in which a coloring liquid is introduced into the albumen of the egg;

Figure 3 is a diagrammatic view illustrating the various positions in which the treated and sealed egg is placed for predetermined times to evenly distribute the coloring liquid through the albumen prior to hatching the egg.

Referring to Figures 1 and 2, $a$ indicates the shell; $b$, the layers of membrana putaminis; $c$, the air space at the butt end of the egg; $d$, the albumen or white; $e$, the chalazae; $f$, the yoke, and $g$, the cicatricle of a hen's egg.

In accordance with the present invention, each egg is suitably supported in an upright position on its butt end instead of as shown in Figures 1 and 2, and the shell $a$ and layers of membrana putaminis $b$, are pierced for a short distance and at a slight angle to the vertical at one side of the chalaza $e$, located at the pointed end of the egg, preferably by means of an ordinary straight pin 5. This produces a minute opening through which may be introduced the needle 6 of a hypodermic syringe 7 having a predetermined quantity of non-alcoholic coloring liquid 8 therein. This charge of coloring liquid is then forced into the albumen or white $d$ of the egg by use of the syringe, care being taken to prevent air from entering the egg. As soon as the needle of the syringe is withdrawn subsequent to introduction of the coloring liquid, the opening in the shell $a$ is sealed as indicated at 9 in Figure 3 by means of a suitable cement.

The treated and sealed egg is then left and supported in an upright position and on its butt end as indicated at 10 in Figure 3, for a predetermined length of time. The egg is thereafter left for a predetermined time in an upright position and on its pointed end as indicated at 11 in Figure 3. This is followed by successively placing the egg horizontal and on opposite sides as respectively indicated at 12 and 13 in Figure 3. By turning the egg and leaving it in different positions as thus described, the coloring liquid is evenly distributed through the albumen of the egg so that the color of the down of the subsequently hatched chick will be uniform. The egg is thereafter hatched in the usual way, and when hatching is performed in an incubator, the cement used to seal the opening in the egg, is preferably of a type which will effectively resist the effect of the intense heat employed during incubation.

In treating the egg, care must be exercised to penetrate the albumen approximately and not more than one-sixteenth of an inch, and the plunger of the syringe should be pressed gently so as to not injure the egg. Also, the egg must be pierced at one side of the chalaza which is located at the pointed end of the egg so that there will be no danger of damaging the vital parts consisting of the chalaza $e$, yoke $f$, and cicatricle $g$. In addition, the air space $c$ must not be pierced to avoid detrimental effects with respect to the chick subsequently hatched. A suitable hypodermic syringe for use in the present method has been found as one currently sold on the market labeled "B-D-No. Olyl-80-insulin." This syringe is one commonly employed in the administration of insulin and has a gauge graduated in forty units to one cc., the capacity of the syringe being one cc. The syringe is preferably equipped with a needle known as gauge 27—½ inch, and one currently on the market suitable for the purpose is known as "B-D-Yale-Lok."

For producing chicks with down of a pastel color, the quantity of coloring material injected into the egg will vary from five to ten units. For producing chicks with down of darker colors, or to produce coloration in the breeds of chicks naturally having dark down the quantity of coloring liquid injected will vary from ten to fifteen units. A coloring liquid which I have found especially suitable is currently sold on the market under the name "Burnett's Liquid Color." However, there are other suitable pure coloring liquids on the market which may be used and which are commonly employed in the production of colored candy and other foods. The coloring medium, being in liquid form, can be readily introduced and will most quickly and thoroughly enter and evenly distribute through the albumen. A sealing cement which has been found satisfactory is currently on the market under the name "Testors Household Cement." It is a sealing liquid which will withstand the intense heat in an incubator for the full period of time required to hatch the egg. Obviously, a pure food coloring liquid is employed for safety reasons, the chick being produced for ultimate food purposes, although initially hatched as an Easter ornament or novelty.

Very satisfactory and uniform results have been attained in actual practice by means of the method described above. Chicks of all breeds may be produced having down colored the desired color and shade as determined by the kind of color injected. The quantity of coloring liquid injected should not exceed fifteen units or three-eighths of one c. c., for safety reasons. In other words, the injection of an excess amount of coloring liquid will either drown or seriously injure the embryo.

When turning the egg to and leaving the same in the different positions of Figure 3, the egg is preferably allowed to stand in each position for approximately six hours so that the even distribution of the coloring liquid may be insured.

From the foregoing description, it is believed that the nature and advantages of the present invention will be readily understood and appreciated by those skilled in the art.

What I claim is:

1. The method of producing chicks having colored down, which consists in piercing the shell of a fertile egg at one side of the chalaza which is located at the pointed end of the egg to provide a minute opening therethrough, introducing a coloring liquid into the albumen through said opening while preventing air from entering the egg, thereafter sealing said opening, and then hatching the egg.

2. The method of producing chicks having colored down, which consists in piercing the shell of a fertile egg at one side of the chalaza which is located at the pointed end of the egg to provide a minute opening therethrough, introducing a coloring liquid into the albumen through said opening while preventing air from entering the egg, thereafter sealing said opening by means of a heat resisting cement, and then hatching the egg.

3. The method of producing chicks having colored down, which consists in piercing the shell of a fertile egg at one side of the chalaza which is located at the pointed end of the egg to provide a minute opening therethrough, introducing a coloring liquid into the albumen through said opening while preventing air from entering the egg, thereafter sealing said opening, then placing the treated and sealed egg in different positions for predetermined periods of time to evenly distribute the coloring liquid through the albumen, and then hatching the egg.

4. The method of producing chicks having colored down of a predetermined color and shade, which consists in piercing the shell of a fertile egg at one side of the chalaza which is located at the pointed end of the egg to provide a minute opening therethrough, introducing by means of a hypodermic syringe having its needle introduced through said opening a coloring liquid into the albumen while preventing air from entering the egg, thereafter sealing said opening, then placing the treated and sealed egg in different positions for predetermined periods of time to evenly distribute the coloring liquid through the albumen, and then hatching the egg.

5. The method of producing chicks having colored down, which consists in piercing the shell of a fertile egg at one side of the chalaza which is located at the pointed end of the egg to provide a minute opening therethrough, introducing from one-eighth to three-eighths of one c. c. of coloring liquid into the albumen through said opening by means of a hypodermic syringe and while preventing air from entering the egg, thereafter sealing said opening, turning the treated and sealed egg to and leaving the same in different positions for predetermined periods of time to evenly distribute the coloring liquid through the albumen, and then hatching the egg.

AYA MARY KISS.

REFERENCES CITED

The following references are of record in the file of this patent:

Public Health Reports, U. S. Public Health Service, vol. 53, No. 51, page 2241, Dec. 23, 1938.